(12) United States Patent
Williams et al.

(10) Patent No.: US 12,514,625 B2
(45) Date of Patent: Jan. 6, 2026

(54) SUPPORT FOR AN ANATOMICAL STRUCTURE

(71) Applicant: KARL LEIBINGER ASSET MANAGEMENT GMBH & CO. KG, Mühlheim (DE)

(72) Inventors: Edgar Mark Williams, Bridgend (GB); Alexander Myles Cletheroe Goodson, Llantwit Major (GB)

(73) Assignee: KARL LEIBINGER ASSET MANAGEMENT GMBH & CO. KG, Mühlheim (DE)

(*) Notice: Subject to any disclaimer, the term of this patent is extended or adjusted under 35 U.S.C. 154(b) by 544 days.

(21) Appl. No.: 17/543,514

(22) Filed: Dec. 6, 2021

(65) Prior Publication Data

US 2022/0168028 A1 Jun. 2, 2022

Related U.S. Application Data

(63) Continuation of application No. PCT/EP2020/065842, filed on Jun. 8, 2020.

(30) Foreign Application Priority Data

Jun. 7, 2019 (GB) .................................... 1908172

(51) Int. Cl.
*A61B 17/80* (2006.01)
*A61B 34/10* (2016.01)
(Continued)

(52) U.S. Cl.
CPC ........ *A61B 17/808* (2013.01); *A61B 17/8071* (2013.01); *A61B 34/10* (2016.02);
(Continued)

(58) Field of Classification Search
CPC .......... A61B 17/8071; A61B 2017/568; A61B 2090/037
See application file for complete search history.

(56) References Cited

U.S. PATENT DOCUMENTS

| 4,905,679 A | * | 3/1990 | Morgan | ............ | A61B 17/8085 606/70 |
| 4,923,471 A | * | 5/1990 | Morgan | ............ | A61B 17/8085 606/907 |

(Continued)

FOREIGN PATENT DOCUMENTS

| CN | 108742814 A | 11/2018 |
| CN | 109620380 A | 4/2019 |
| WO | 2011136775 A1 | 11/2011 |

OTHER PUBLICATIONS

International Search Report and Written Opinion dated Oct. 19, 2020 for PCT Application No. PCT/EP2020/065842.
(Continued)

*Primary Examiner* — David W Bates
(74) *Attorney, Agent, or Firm* — EIP US LLP

(57) ABSTRACT

An apparatus for providing structural support to an anatomical structure is disclosed. The apparatus comprises a plurality of connection structures and a frame structure. Each of the plurality of connection structures is arranged that, in use, they are connected to at least two points on an anatomical structure. In use, each connection structure is arranged to be orientated in a predetermined orientation and to be separated from each other connection structure by a predetermined separation. The frame structure connects each of the plurality of connection structures. The frame structure is arranged to maintain the predetermined orientations of the plurality of connection structures and the predetermined separations between the plurality of connection structures.

14 Claims, 3 Drawing Sheets

(51) Int. Cl.
   *A61B 90/00* (2016.01)
   *A61B 17/00* (2006.01)
   *A61B 17/56* (2006.01)

(52) U.S. Cl.
   CPC .... *A61B 90/37* (2016.02); *A61B 2017/00526* (2013.01); *A61B 2017/00836* (2013.01); *A61B 2017/568* (2013.01); *A61B 2034/102* (2016.02); *A61B 2034/105* (2016.02); *A61B 2034/108* (2016.02); *A61B 2090/3762* (2016.02)

(56) References Cited

U.S. PATENT DOCUMENTS

| | | | | |
|---|---|---|---|---|
| 4,959,065 A * | 9/1990 | Arnett | ................ | A61B 17/8085 606/285 |
| 5,690,631 A * | 11/1997 | Duncan | .............. | A61B 17/8085 606/284 |
| 5,718,705 A * | 2/1998 | Sammarco | ......... | A61B 17/8863 606/280 |
| 6,652,530 B2 * | 11/2003 | Ip | ...................... | A61B 17/8085 606/284 |
| 7,335,204 B2 * | 2/2008 | Tornier | .............. | A61B 17/8061 606/280 |
| 7,717,946 B2 * | 5/2010 | von Oepen | ........ | A61B 17/8085 606/76 |
| 9,066,733 B2 * | 6/2015 | Furrer | ................... | A61B 17/151 |
| 10,499,962 B2 * | 12/2019 | Burckhardt | ............ | A61B 17/80 |
| 11,896,273 B2 * | 2/2024 | Simpson | ............... | A61B 17/151 |
| 2010/0106197 A1 * | 4/2010 | Buscher | ............... | A61B 17/151 606/286 |
| 2011/0166573 A1 | 7/2011 | Wenk et al. | | |
| 2011/0301609 A1 * | 12/2011 | Longepied | ......... | A61B 17/8071 606/281 |
| 2015/0142000 A1 * | 5/2015 | Seedhom | ............... | A61B 90/37 606/87 |
| 2018/0280090 A1 | 10/2018 | Davies et al. | | |

OTHER PUBLICATIONS

United Kingdom Combined Search and Examination report dated Nov. 28, 2019 for GB Application No. GB 1908172.8.

United Kingdom Examination report dated Sep. 30, 2021 for GB Application No. GB 1908172.8.

* cited by examiner

SUPPORT FOR AN ANATOMICAL STRUCTURE

CROSS-REFERENCE TO RELATED APPLICATIONS

This application is a continuation of International Application No. PCT/EP2020/065842, filed Jun. 8, 2020 which claims priority to UK Application No. GB 1908172.8, filed Jun. 7, 2019, under 35 U.S.C. § 119(a). Each of the above referenced patent applications is incorporated by reference in its entirety.

BACKGROUND

Field of the Invention

The present invention relates to an apparatus for providing support to an anatomical structure and methods of manufacturing and operating the same.

Description of the Related Technology

Osteosynthesis is a surgical procedure for the fixation of bone, that may be used to treat bone fractures, or in bone reconstruction surgery. Bone fragments (either fractured bone fragments in the case of a bone fracture or segments of grafted bone in the case of a reconstruction) are joined with screws, plates, nails or wires.

For example, reconstruction of the lower jaw (mandible) is commonly performed following removal of a malignant tumour or disease. Typically, this involves placement of a bone graft from the leg into the jaw, which is then secured in place with a single titanium osteosynthesis reconstruction plate allowing healing via the growth of new bone material to take place over the course of several weeks or months.

The use of a single plate provides a support structure that is stiff and supports loads to which the healing bone structure might be subjected. However, when using a single plate, if there is a problem with one part of the plate—for example, if the patient develops an infection at the site of one of the screws fixing the plate to the bone fragments—then the entire plate may need to be removed and replaced, and potentially all of the grafted bone may also need to be replaced.

An alternative approach uses multiple so-called "miniplates" which are arranged to share the load. Such miniplates are inherently lighter and can be more flexible in the sense that the same design of mini-plate may be used in multiple, different, applications (and possibly with multiple patients), rather than being custom made for one specific patient's needs. Mini-plates may be either 'off-the-shelf' miniplates or 'custom' mini-plates. 'Off-the-shelf' miniplates are not produced for any specific patient and are typically bent by hand into a configuration that meets the requirement of whatever patient they are to be used on. In contrast, custom mini-plates are produced for specific patients (for example using 3D printing) in a pre-determined configuration that meets the requirements of the specific patient they are to be used on. The miniplates are easier to remove in the event of failure, infection etc. because only the affected miniplate at a single osteotomy site needs to be removed (as opposed to the whole plate). In this respect they are potentially safer since removal of a single miniplate can be achieved with a smaller incision rather than requiring extensive surgical access.

However, the use of miniplates comes with some potential drawbacks. For example, positioning multiple miniplates placed in series to support a reconstructed portion of bone material is technically more difficult for a surgeon to achieve. Accordingly, there is an increased probability that errors in the placement of the miniplates will occur. In particular, relatively minor angulation errors in screw placement at each miniplate can potentially lead to a more significant vector error overall along the length of the osteotomised region (e.g. a fibular flap), thus compromising morphological accuracy. Such errors in placement can accumulate (in an additive manner), making the overall result less accurate with respect to surgical procedures that use a single, bespoke, plate.

These problems are solved or mitigated by the present invention.

SUMMARY

According to a first aspect of the present invention, there is provided an apparatus for providing structural support to an anatomical structure, the apparatus comprising:
  a plurality of connection structures being arranged that, in use, they are connected to at least two points on an anatomical structure, and wherein, in use, each connection structure is arranged to be orientated in a predetermined orientation relative to the other connection structures and to be separated from the other connection structure by a predetermined separation; and
  a removable frame structure connecting each of the plurality of connection structures, the frame structure being arranged to maintain the predetermined orientations of the plurality of connection structures and the predetermined separations between the plurality of connection structures.

In some embodiments, the plurality of connection structures each comprises one or more connection portions for connecting the respective connection structures to an anatomical structure.

In some embodiments, the one or more connection portions each comprises a through hole for receiving a fixing device arranged to fix the respective connection structure to an anatomical structure.

In some embodiments, the through holes are for receiving a screw arranged to fix the respective connection structure to an anatomical structure.

In some embodiments, the apparatus is for providing structural support to a plurality of bone fragments.

In some embodiments, the plurality of connection structures is formed with the frame structure by an additive manufacturing process.

In some embodiments, the apparatus comprises separation portions located between the frame structure and the plurality of connection structures, the separation portions each being arranged to provide a break point between the frame structure and the plurality of connection structures.

In some embodiments, the apparatus comprises a metal material. For example, the metal material may be titanium or cobalt chrome.

According to a second aspect of the present invention, there is provided a method of manufacturing an apparatus according to the first aspect, the method comprising:
  receiving a model of an apparatus according to the first aspect, the model being based on image data representing an image of an anatomical structure; and manufacturing the apparatus according to the first aspect based on the received model.

In some embodiments, the method comprises: receiving image data representing an image of an anatomical structure; and generating the model on the basis of the received image data.

In some embodiments, the method comprises generating the image data.

In some embodiments, the image data represents computed tomography data.

In some embodiments, the apparatus is manufactured using an additive manufacturing process.

According to a third aspect of the present invention, there is provided a method of operating an apparatus according to the first aspect, the method comprising:

fixing the one or more connection structures to one or more anatomical structures; and separating the frame structure from the one or more connection structures.

According to a fourth aspect of the invention, there is provided an apparatus for providing structural support to an anatomical structure, the apparatus comprising a frame structure arranged to be connected to a plurality of connection structures, the frame structure being arranged to maintain predetermined orientations of the plurality of connection structures and predetermined separations between the plurality of connection structures.

Further features and advantages of the invention will become apparent from the following description of preferred embodiments of the invention, given by way of example only, which is made with reference to the accompanying drawings.

DETAILED DESCRIPTION OF ILLUSTRATED EMBODIMENTS

Figure 1:
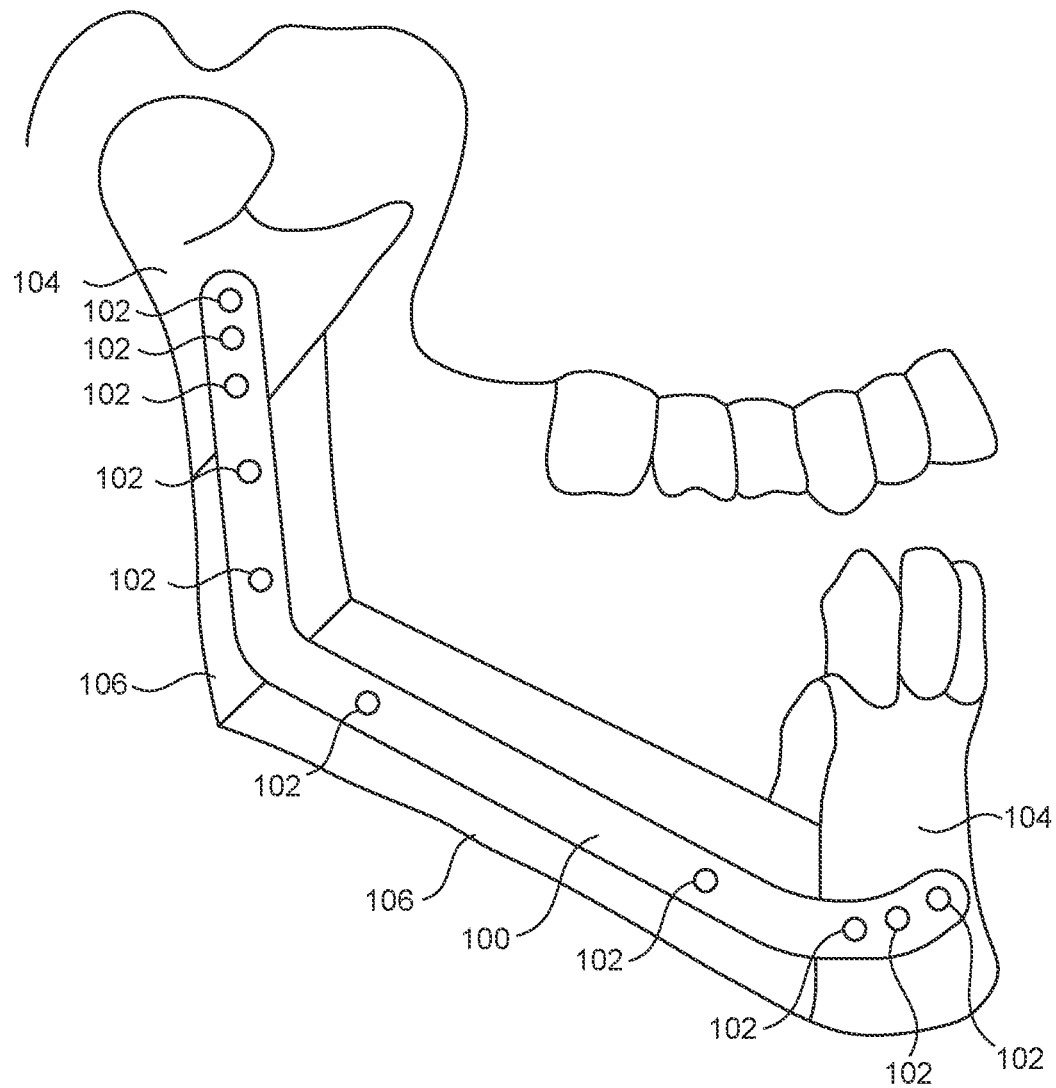
FIG. 1 is a schematic diagram showing a pictorial view illustrating a prior art osteosynthesis reconstruction plate used for mandibular reconstruction.

FIG. 1 is a schematic diagram showing a pictorial view illustrating a conventional osteosynthesis reconstruction plate 100 used for mandibular reconstruction. The reconstruction plate 100 comprises a preformed, single-piece, metallic frame that provides a rigid support structure. The reconstruction plate 100 comprises connection portions 102 for connecting the reconstruction plate 100 to portions of bone from the natural anatomy of a patient (referred to hereinafter as first bone portions 104) and portions of bone which are to be used as a bone graft, which may have been harvested from another part of the patient's anatomy (referred to hereinafter as second bone portions 106). The reconstruction plate thereby acts to anchor the second bone portions 106 to the first bone portions and to provide support to the second bone portions 106 to maintain their position and alignments with respect to the first bone portions 104.

Although, the reconstruction plate 100 described above with reference to FIG. 1 is described with reference to a mandibular reconstruction procedure using grafted bone, in some applications, the same or a similar reconstruction plate 100 can be used in the repair of a fracture. In such applications of the reconstruction plate 100, the second bone portions 106 may also be bone portions from the patient's natural anatomy, rather than grafted bone fragments.

The reconstruction plate 100 is designed to be attached via the connection portions 102 to the first and second bone portions 104, 106. For example, the connection portions 102 may comprise through holes located in the apparatus 100 through which screws or other fasteners may be inserted to connect the reconstruction plate 100 to the first and second bone portions 104, 106, thereby providing structural support for the first and second bone portions 104, 106 while the respective bone portions 104, 106 heal.

Figure 2:
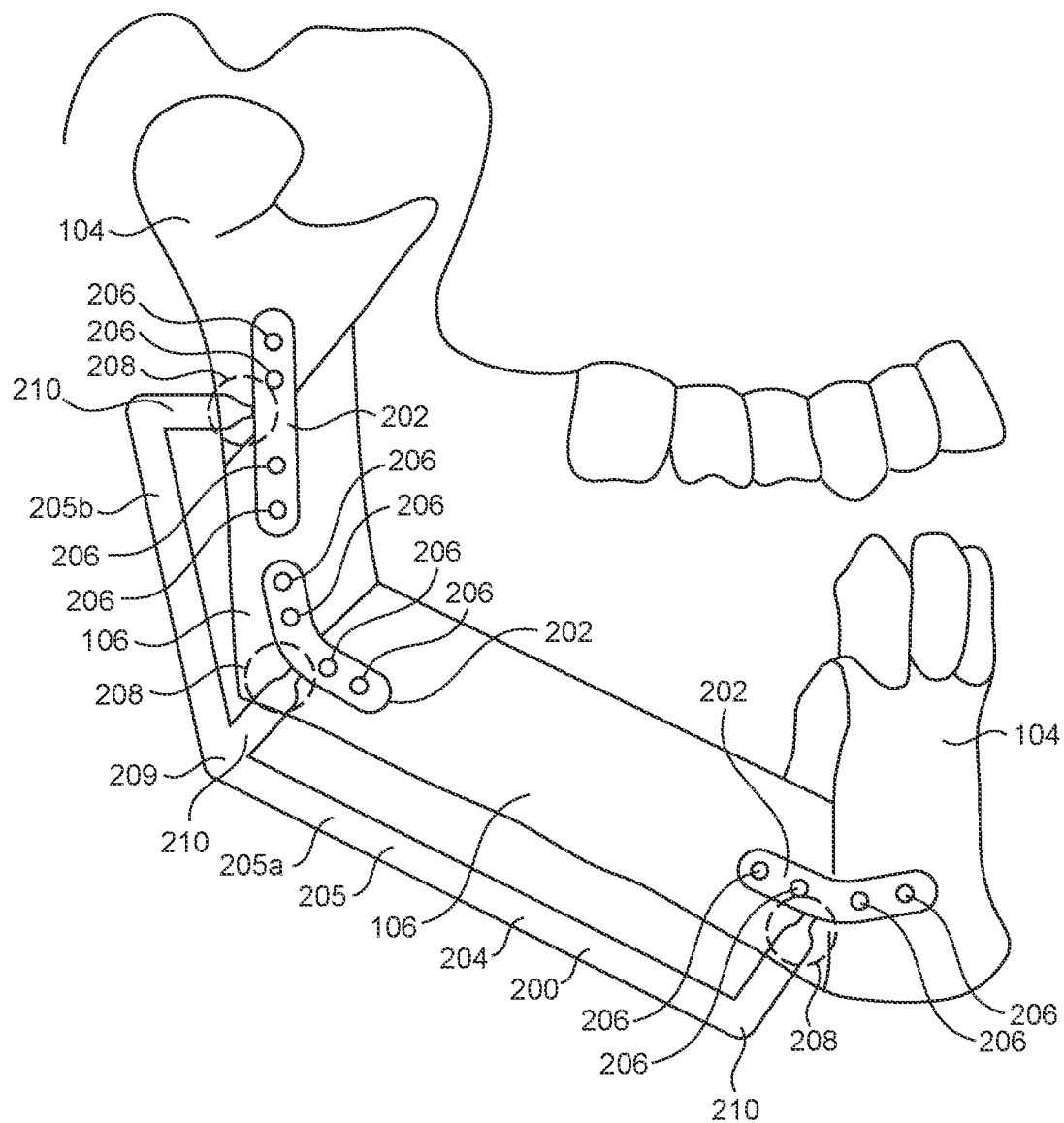
FIG. 2 is a schematic diagram showing a pictorial view illustrating an apparatus for osteosynthesis reconstruction according to a first aspect of the present invention.

FIG. 2 is a schematic diagram showing a pictorial view illustrating an apparatus 200 according to the present invention. The apparatus 200 may be used in place of the prior art reconstruction plate 100 described above with reference to FIG. 1.

The apparatus 200 comprises a series of connection structures, referred to herein as miniplates 202, attached to each other by a removable frame structure referred to herein as a jig bar 204.

The connection structures each comprise one or more connection portions 206, which are the same or similar to the connection portions 106 described above with reference to FIG. 1. In particular, the connection portions 206 may comprise through holes located in the apparatus 200 through which screws or other fasteners may be inserted to connect the miniplates 202 to the first and second bone portions 104, 106, thereby providing structural support for the first and second bone portions 104, 106 while the respective bone portions 104, 106 heal.

The jig bar 204 is formed with the miniplates 202 to maintain the position and orientation of each of the miniplates 202 while the miniplates are being fixed to the appropriate anatomical structures during a surgical procedure. In particular, at the time of fixation of the apparatus 200 to a patient, the multiple miniplates 202 are fixed to the jig bar 204 so that the surgeon can easily handle the apparatus 200 (by e.g. gripping the jig bar 204), can manipulate the apparatus 200 (and therefore all of the respective miniplates 202, at once) into the correct position and orientation, and then affix the miniplates 202 to the appropriate tissue or bone structures of the patient. In other words, the apparatus 200 described with reference to FIG. 2 provides at least the same, and possibly improved, positional accuracy as the prior art reconstruction plate 100 described with reference to FIG. 1. Furthermore, physical separation of the jig bar 204 from the miniplates 202 of the apparatus 200 of FIG. 2 provides a means for the surgeon to handle and manipulate the apparatus 200 more easily than the reconstruction plate 100 described with reference to FIG. 1 can be handled, while the apparatus 200 is being fixed in place.

As described in more detail below, with reference to FIG. 4, once the miniplates 202 are fixed in place, the surgeon can remove the jig bar 204. For example, using a bur tool, the surgeon may separate the jig bar 204 from the miniplates 202.

In some embodiments, as shown in FIG. 2, the apparatus 200 comprises separation portions 208 between the jig bar 204 and each of the miniplates 202. The separation portions 208 may, in some examples, comprise a region which is formed of material that is thinner than the surrounding material. For example, the separation portions 208 may comprise a waist between the jig bar 204 and the miniplates 202.

As depicted in FIG. 2, in this example, the jig bar 204 comprises a support member 205 and a plurality of spurs 210 each of which extends away from, for example, transversely or laterally, the support member 205 and connects to a respective one of the miniplates 202. In this example, the support member 205 is a bar. The support member 205 comprises a first section 205a and a second section 205b which are joined at a bend 209 and define an angle which, in this example, is obtuse. A respective spur 210 extends from each end of the support member 205 and from the bend. In this example, the first section 205a is longer than the second section 295b although it should be appreciated that the configuration of the apparatus 200, including the lengths of the first section 205a and the second section 205b and the angle between them, will depend upon the requirements of the surgical procedure that is to be performed.

In some examples the separation portions 208 may comprise a thinned portion of the respective spurs 210 located at or near the points where the spurs 210 meet the miniplates 202. In some examples, the separation portion 208 may be sufficiently thinned as to allow the surgeon to snap the jig bar 204 away from the miniplates 202.

The apparatus 200 described above with reference to FIG. 2 may be formed of any appropriate material. However, in preferred examples, the apparatus 200 is formed of a metal material such as titanium or cobalt chrome. In other examples, the apparatus 200, or portions of the apparatus 200 such as the miniplates 202, may be formed of a resorbable material. For example, the apparatus 200, or portions of the apparatus 200 such as miniplates 202, may be formed from poly L-lactide (PLLA), polyglycolide (PGA), poly D-lactide (PDLA) or some combination thereof.

In the example of a fibular mandibular reconstruction, as described above, the surgeon can manipulate the apparatus 200 such that the miniplates 202 configured (i.e. positioned and orientated) to meet with the first bone portions 104), fix those miniplates 202 to the first bone portions 202, and then fix the second bone portions 106 to the correspondingly positioned and orientated miniplates 202. Accordingly, the second bone portions 106 can be fixed in the correct position and orientation as a single unit thus minimising the possibility that the miniplates 202 will be positioned incorrectly. Once the miniplates 202 are fixed to the first and second bone portions 104, 106, in the required spatial position and orientation, the surgeon can remove the jig bar 204.

Attaching the miniplates 202 to the jig bar 204 as a single unit may provide that fixation will be technically easier and therefore quicker to perform, reducing surgical time.

Advantageously, the jig bar 204 connects the miniplates 202 in parallel but stands away from the bone portions 104, 106 when the surgical procedure to fix the miniplates 202 into position is ongoing. This reduces the likelihood of there being damage or interruption of the blood vessels and/or muscle or soft tissue around the bone portions 104, 106 and between the individual miniplates 202.

Furthermore, removing the jig bar 204 as a single unit from the miniplates 202 after the miniplates 202 have been fixed into position simplifies the surgical procedure.

It will be understood that while the examples described herein relate to reconstruction plates for repair or reconstruction of mandibles, the principles disclosed are applicable to apparatus for supporting other anatomical structures. For example, the apparatus 200 may be designed to provide structural support to other axial or appendicular skeletal structures such as leg, arm, hand or foot bones, cranial bones, facial bones, vertebral bones and/or pelvic bones, or for soft tissues such as tendons, ligaments, blood vessels, muscle tissue, neural tissue (in the brain or elsewhere in the nervous system), and/or cardiac tissue (such as heart valves or myocardium).

Figure 3:
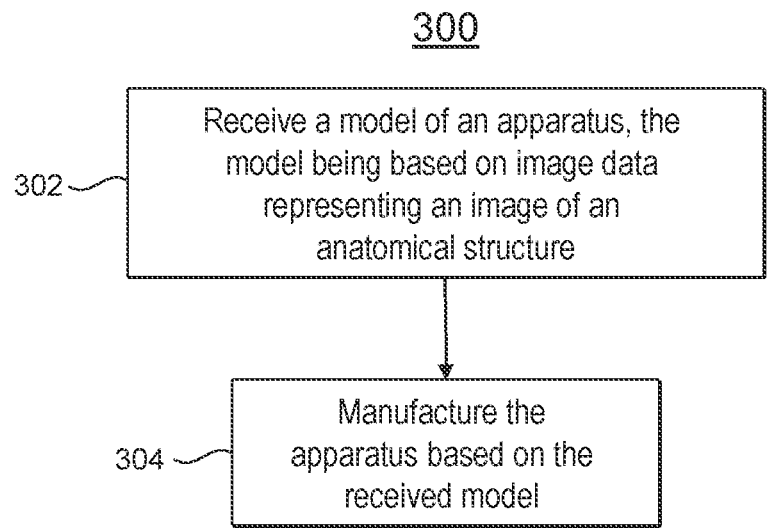
FIG. 3 is a flow diagram of a method for manufacturing an apparatus according to the first aspect of the present invention.

FIG. 3 is a flow diagram illustrating a method 300 of manufacturing an apparatus, such as the apparatus 200 described above with reference to FIG. 2.

At block 302, a model of an apparatus is received. The model is based image data representing an image of an anatomical structure. For example, in relation the mandibular reconstruction example described above with reference to FIG. 1, the image data may represent an image of the skull, or a portion of the skull including the mandible, of a patient to which an apparatus 200 is to be applied (for example, by surgical implantation).

In some examples, the model may be generated based on image data received from a third party. For example, the image data may be retrieved from a picture archiving and communication system (PACS). For example, the image may be routed to a data processing apparatus using Digital Imaging and Communications in Medicine (DICOM) routing. In some embodiments, the data processing apparatus may be part of an image acquisition system, such as, for example, an X-ray fluoroscopy device, a computed tomography device, a magnetic resonance imaging device a molecular imaging device, a SPECT device, a PET device or combinations thereof. Alternatively, the data processing apparatus may be separate from the imaging device used to acquire an image and may be retrieved by the data processing apparatus or sent to the data processing apparatus via a communications interface.

The data processing apparatus may be a general-purpose computing device executing software arranged to generate the model based on the image data representing the image of the anatomical structure.

At block 304, an apparatus, such as the apparatus 200 described above with reference to FIG. 2, is manufactured based on the received model. For example, the apparatus may be manufactured using an additive manufacturing process.

Additive manufacturing is a process by which a structural component can be formed by selectively adding layers of material, rather than removing, for example by machining, material to form the component. For example, in some additive manufacturing processes, a layer of powdered material is deposited, and particles of the powdered material are selectively fused (for example by melting the powdered particles with a directable energy source). Following fusion of a selected portion of the layer, a further layer of powdered material is deposited and selectively fused. By selectively fusing the powdered material in multiple layers, a three-dimensional object or component can be manufactured.

Additive manufacturing processes can be used to produce bespoke components because the dimensions of components manufactured by an additive manufacturing process can be easily specified using, for example, computer aided design (CAD) tools. Furthermore, additive manufacturing processes can enable components with complex geometries to be produced, which would otherwise be difficult to produce using non-additive manufacturing processes.

The additive manufacturing process may include one or more of: selective laser melting; 3D inkjet printing; laser sintering; electron beam melting.

Alternatively, the apparatus 200 could be manufactured by a subtractive manufacturing method, such as milling, or by other manufacturing (not classified as additive or subtractive), such as casting.

Figure 4:
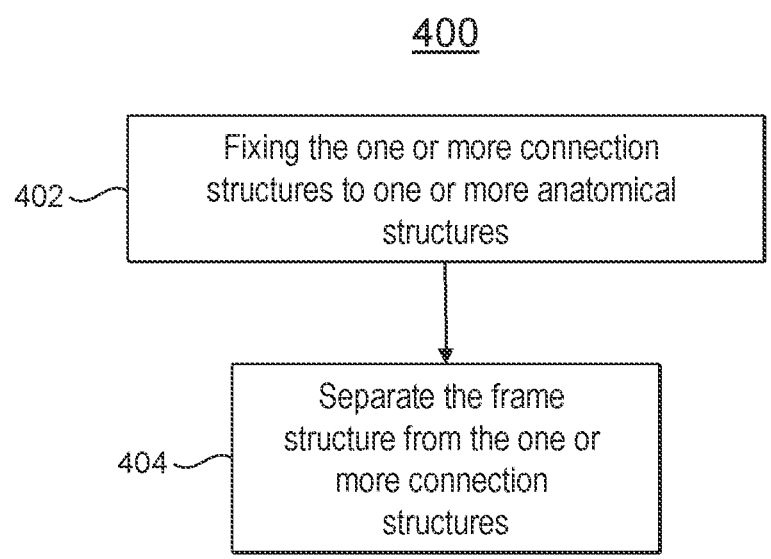
FIG. 4 is a flow diagram of a method for installing an apparatus according to the first aspect of the present invention.

FIG. 4 is a flow diagram illustrating a method 400 of installing an apparatus, such as the apparatus 200 described above with reference to FIG. 2. That is an apparatus comprising a plurality of connection structures and a frame structure connecting each of the plurality of connection structures, in which the frame structure is arranged to maintain the predetermined orientations of the plurality of connection structures and the predetermined separations between the plurality of connection structures.

At block 402, one or more connection structures (e.g. miniplates 202) is connected to one or more anatomical structures. For example, as described above, the connection structures may comprise through holes for receiving screws, plates, nails wires, pins, sutures, or other fixing means to physically fix the connecting structures to a portion of the anatomy of a patient.

At block 404, once each of the required connection structures (e.g. miniplates 202) is connected and the apparatus (e.g. apparatus 200) is fixed in place, the frame structure (e.g. the jig bar 204) is separated from the one or more connection structures (e.g. miniplates 202). For example, during a surgical procedure, a surgeon may use a surgical bur tool, cutting pliers, or any other appropriate tool, to cut through a join between the frame structure and the connection structures. That is, in relation to the apparatus 200 described with reference to FIG. 2, the surgeon can remove the jig bar 204 from the miniplates 202, to then close the surgical wound without any protruding medical apparatus.

Accordingly, the apparatus 200 described herein, the methods of manufacturing such an apparatus, and the methods of installing such an apparatus, may provide significant improvements to the ease and/or efficiency with reconstructive surgery can be performed. In particular, the apparatus 200 described above with reference to FIG. 2 may provide the accurate placement of the prior art reconstruction plate described with reference to FIG. 1, while not suffering the potential drawbacks that the reconstruction plate 100 of FIG. 1 has in the event of a problem following installation of the plate 100. Meanwhile, in the event of a post-surgical problem, the apparatus 200 described herein has the advantage of conventional miniplates that only the miniplate at the affected osteotomy site needs to be removed (and that therefore the post-surgical incision can be much smaller, reducing the impact on the patient).

The above embodiments are to be understood as illustrative examples of the invention. Further embodiments of the invention are envisaged. For example, although the embodiments described above with reference to FIGS. 2 to 4 are described in relation to a jig for use in mandibular reconstruction surgery, the apparatus could be configured, and the methods applied, to aid any type of osteotomy surgery in which it is desirable to manipulate, orientate and fix anatomical structures in predetermined anatomical locations. For example, the apparatus and methods described herein may be used in cranial reconstructions, maxillary reconstructions, zygomatic reconstructions, orbital reconstructions, nasal osteotomies, orthopaedic osteotomy, dental surgery (such as placement of caps, fillings, dental implants, tooth restorations, cardiac implants, neural implants, or indeed any medical or surgical application in which multiple implants or connection structures are to be fixed in predetermined positions and orientations. Furthermore, although in the examples described above the frame structure is formed integrally with the connection structures, in other examples the connection structures may be connectable to the frame structure by a releasable fixing, such as a screw fitting or a nut and bolt arrangement. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus for providing structural support to an anatomical structure, the apparatus comprising:
at least three connection structures being arranged so that, in use, they are each connectable to respective points on the anatomical structure, and wherein, in use, each connection structure is arranged to be orientated in a predetermined orientation relative to each of the other connection structures and to be separated from each of the other connection structures by a predetermined separation; and
a frame structure formed with and connecting each of the at least three connection structures together in order to maintain the predetermined orientations of the at least three connection structures and the predetermined separations between the at least three connection structures while the at least three connection structures are being connected to the anatomical structure, wherein the frame structure comprises a bar and at least three spurs which extend laterally away from the bar, each spur connecting laterally to a respective different one of the at least three connection structures and wherein the frame structure is removable from the at least three connection structures after the at least three connection structures have been connected to the anatomical structure.

2. The apparatus according to claim 1, wherein the at least three connection structures each comprises one or more connection portions for connecting the respective connection structure to the anatomical structure.

3. The apparatus according to claim 2, wherein the one or more connection portions each comprises a through hole for receiving a fixing device arranged to fix the respective connection structure to the anatomical structure.

4. The apparatus according to claim 3, wherein the through holes are for receiving a screw arranged to fix the respective connection structure to the anatomical structure.

5. The apparatus according to claim 1, wherein the apparatus is for providing structural support to a plurality of bone fragments.

6. The apparatus according to claim 1, wherein the at least three connection structures are formed with the frame structure by an additive manufacturing process.

7. The apparatus according to claim 1, wherein each of the at least three spurs comprises a respective thinned portion located at or near the point that the spur connects to its respective different one of the at least three connection structures, the thinned portions each being arranged to provide a break point between the frame structure and the at least three connection structures.

8. The apparatus according to claim 1, comprising a metal material.

9. The apparatus according to claim 8, wherein the metal material comprises titanium and/or cobalt chrome.

10. The apparatus according to claim 1, wherein the bar comprises a first section and a second section joined at a bend and wherein a first one of the at least three spurs extends away from the bar from an end of the first section, a second one of the at least three spurs extends away from the bar from an end of the second section and a third one of the at least three spurs extends away from the bar from the bend.

11. The apparatus according to claim 1, wherein each of the at least three connection structures is a mini-plate.

12. The apparatus according to claim 11, wherein each spur connects to its respective one of at least three mini-plates at a position that is located between first and second ends of that mini-plate.

13. The apparatus according to claim 11, wherein the at least three mini-plates are osteosyntheses mini-plates.

14. An apparatus for providing structural support to an anatomical structure, the apparatus comprising:
  at least three connection structures being arranged so that, in use, they are each connectable to respective points on the anatomical structure, and wherein, in use, each connection structure is arranged to be orientated in a predetermined orientation relative to each of the other connection structures and to be separated from each of the other connection structures by a predetermined separation; and
  a frame structure formed with and connecting each of the at least three connection structures together in order to maintain the predetermined orientations of the at least three connection structures and the predetermined separations between the at least three connection structures while the at least three connection structures are being connected to the anatomical structure, wherein the frame structure comprises a bar and at least three spurs which extend away from the bar, each spur connecting to a respective different one of the at least three connection structures and wherein the bar and the at least three spurs are configured so that the bar stands away from the anatomical structure while the at least three connection structures are being connected to the anatomical structure.

* * * * *